United States Patent Office 3,359,282
Patented Dec. 19, 1967

3,359,282
(OPTIONALLY 17-ALKYLATED)-3-OXA-5α-ANDRO-STAN-17β-OLS, ESTERS CORRESPONDING AND INTERMEDIATES THERETO
Raphael Pappo, Skokie, and Mike G. Scaros, Arlington Heights, Ill., assignors to G. D. Searle & Co., Chicago, Ill., a corporation of Delaware
No Drawing. Filed Sept. 24, 1965, Ser. No. 490,068
11 Claims. (Cl. 260—345.2)

The present invention is concerned with novel heterocyclic steroidal derivatives and, more particularly, with the (optionally 17-alkylated)-3-oxa-5α-androstan-17β-ols and corresponding esters represented by the following structural formula

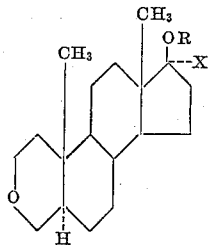

wherein R can be hydrogen or a lower alkanoyl radical and X designates hydrogen or a lower alkyl radical.

Representative of the lower alkyl radicals symbolized by X in the foregoing structural representation are methyl, ethyl, propyl, butyl, pentyl, hexyl, heptyl and the branched-chain groups isomeric therewith.

The lower alkanoyl radicals encompassed in that structural formula are typified by formyl, acetyl, propionyl, butyryl, valeryl, caproyl, heptanoyl and the branched-chain radicals isomeric therewith.

Suitable starting materials for use in the manufacture of the compounds of this invention are the A-ring lactones described in our co-pending application Ser. No. 420,204, filed Dec. 21, 1964, now U.S. Patent No. 3,282,-962. When those lactones are reduced with a suitable reagent, cleavage of the A-ring structure occurs to afford the instant novel 2,3-seco intermediates. As a specific illustration, 17β-hydroxy-17α-methyl-3-oxa-5α - androstan-2-one in tetrahydrofuran is heated with lithium aluminum hydride, thus affording 17α-methyl-2,3-seco-A - nor - 5α-androstane-2,3,17β-triol. Acylation of those triols with a lower alkanoic acid anhydride or halide, preferably in the presence of a suitable acid acceptor yields the corresponding (lower alkanoates). The aforementioned 17α-methyl-2,3-seco-A-nor-5α-androstane-2,3,17β - triol is thus contacted with acetic anhydride and pyridine at room temperature, in that way yielding 17α-methyl-2,3-seco-A-nor-5α-androstane-2,3,17β-triol 2,3-diacetate.

Dehydration of the 2,3-seco intermediaes to afford the instant 3-oxa compounds is effected by a reaction with a suitable acid catalyst in an inert solvent medium. When the above described 17α-methyl-5α-androstane-2,3,17β-triol is contacted with p-toluenesulfonyl chloride in pyridine at room temperature, the instant 17α-methyl-3-oxa-5α-androstan-17β-ol is produced.

An especially preferred method for manufacture of the 3-oxa-17-(lower alkanoates) of this invention involves acylation of the corresponding 17-hydroxy substances. A specific illustration is the reaction of 3-oxa-5α-androstan-17β-ol with acetic anhydride in pyridine to afford 3-oxa-5α-androstan-17β-ol 17-acetate.

The 3-oxa compounds of the present invention are useful as a result of their valuable pharmacological properties. They are hormonal agents, for example, as is evidenced by their anabolic and androgenic activity. In addition, they inhibit dicotyledonous seed germination. The 2,3-seco compounds of this invention are useful as intermediates in the manufacture of the instant 3-oxa compounds and are also anti-bacterial, anti-protozoal and anti-algal agents as is evidenced by their ability to inhibit the growth of such organisms as *Diplococcus pneumoniae, Tetrahymena gelleii* and *Chlorella vulgaris*.

The following examples illustrate in further detail some of the compounds which constitute this invention together with methods for their preparation. The invention however is not to be construed as limited thereby either in spirit or in scope as many modifications both in materials and methods can be adapted without departing from the invention herein described. In these examples temperatures are indicated in degrees centigrade (° C.) and quantities of materials in parts by weight unless otherwise noted.

EXAMPLE 1

A solution of potassium tertiary-butoxide in tertiary-butyl alcohol is prepared by adding 3.2 parts of potassium metal to 160 parts of tertiary-butyl alcohol and heating that mixture at the reflux temperature under nitrogen until the metal is completely dissolved. Twenty-four parts of 17β-hydroxy-17α-methyl-5α-androstan-3-one are then added, and the resulting mixture is shaken in an oxygen atmosphere at a pressure of 10–30 pounds per square inch for about 5 days. Completion of the reaction is indicated by the cessation of formation of carbon monoxide gas in the mixture. At the end of the reaction period the mixture containing 17β-hydroxy-17α-methyl-3-oxo - 2,3-seco-A-nor-5α-androstan-2-oic acid is diluted with 240 parts of methanol and 150 parts of water. To that mixture are then added 24 parts of sodium borohydride, and the resulting solution is allowed to stand at room temperature for about 16 hours. Following that reaction period, approximately 100 parts of water are added, and the volatile solvents are removed by distillation under reduced pressure. A small amount of insoluble material is removed by filtration, and the filtrate is extracted with chloroform. The aqueous layer is separated and made strongly acidic by the addition of hydrochloric acid, and that acidic solution is extracted with chloroform. The chloroform solution is washed with cold 5% aqueous sodium hydroxide, then is dried over anhydrous sodium sulfate and stripped of solvent under reduced pressure. The resulting crude product consisting of a mixture of 17β-hydroxy-17α-methyl-3-oxa-5α-androstan-2 - one and 17β-hydroxy-17α-methyl-2-oxa-5α-androstan-3-one is dissolved in 80 parts of methanol, and a solution of 2 parts of sodium hydroxide in 2 parts of water is added. That solution is kept at room temperature for about 5 minutes, then is extracted with benzene. The benzene layer is separated, washed with water, dried over anhydrous sodium sulfate and stripped of solvent under reduced pressure. The resulting oily residue is recrystallized from isopropyl alcohol to afford pure 17β-hydroxy-17α-methyl-3-oxa-5α-androstan-2-one, melting at about 213–217°.

EXAMPLE 2

The substitution of an equivalent quantity of 17α-ethyl-17β-hydroxy-5α-androstan-3-one in the procedure described in Example 1 results in 17α-ethyl-17β-hydroxy-3 - oxo - 2,3 - seco - A - nor - 5α - androstan - 2 - oic acid and 17α - ethyl - 17β - hydroxy - 3 - oxa - 5α - androstan-2-one.

EXAMPLE 3

A mixture of 3.5 parts of potassium metal and 160 parts of tertiary-butyl alcohol is heated at the reflux temperature in a nitrogen atmosphere for about 2 hours, during which time the metal completely dissolves. To the resulting solution is added 25 parts of 17β-hydroxy-5α-androstan-3-one, and that reaction mixture is shaken in an oxygen atmosphere at an initial pressure of 30 pounds per square inch for about 73 hours. The gaseous atmosphere is replaced by fresh oxygen every 12 hours. At the end of each period the gaseous atmosphere is tested for carbon monoxide gas, using palladous chloride. The resulting solution, containing 17β-hydroxy-3-oxo-2,3-seco-A-nor-5α-androstan-2-oic acid, is diluted with 200 parts of methanol and 150 parts of water, and 25 parts of sodium borohydride in then added. The resulting mixture is kept at room temperature for about 16 hours, then is filtered in order to remove a small amount of insoluble material and is washed with chloroform. The aqueous layer is made acidic by the addition of hydrochloric acid, then is extracted with chloroform. A small quantity of insoluble material is removed by a second filtration, and the chloroform filtrate is washed with dilute aqueous sodium bicarbonate, then is dried over anhydrous sodium sulfate and stripped of solvent under reduced pressure. To the resulting residue is added 30 parts of pyridine and 15 parts of acetic anhydride, and that reaction mixture is kept at room temperature for about 22 hours, then is diluted with ice and stirred for about 2 hours. The crystalline product thus produced is collected by filtration and recrystallized first from methylene chloride-hexane then from methanol to afford pure 17β-acetoxy-3-oxa-5α-androstan-2-one, melting at about 174–177°.

EXAMPLE 4

To a solution of 1.82 parts of 17β-hydroxy-17α-methyl-3-oxa-5α-androstan-2-one in 162 parts of tetrahydrofuran is added 1.8 parts of lithium aluminum hydride followed by 54 parts of tetrahydrofuran. The resulting reaction mixture is stirred at room temperature, under nitrogen, for about 16 hours, then is heated at the reflux temperature for about 2 hours. Cooling of the mixture followed by dilution with 2 parts of water, 1.5 parts by volume of 20% aqueous sodium hydroxide and 7 parts of water results in precipitation of inorganic salts which are removed by filtration. Those salts are washed on the filter with tetrahydrofuran, and the combined filtrate and washings are distilled to dryness under reduced pressure. The resulting crystalline crude product is triturated with benzene to afford 17α-methyl-2,3-seco-A-nor-5α-androstane-2,3,17β-triol, melting at about 205–208°. Recrystallization from isopropyl alcohol affords the pure material, melting at about 207–209°. This compound can be represented by the following structural formula

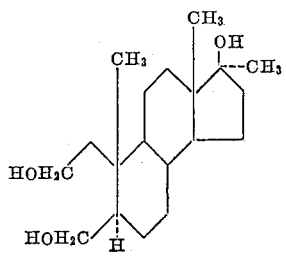

EXAMPLE 5

A solution of 1.8 parts of 17α-methyl-2,3-seco-A-nor-5α-androstane-2,3,17β-triol in 30 parts of pyridine is prepared by warming, then is cooled to room temperature at which point 15 parts of acetic anhydride is added. The resulting reaction mixture is kept at room temperature for about 21 hours, then is diluted carefully with ice. The resulting oily product is extracted into chloroform, and the chloroform layer is separated, washed successively with dilute hydrochloric acid, 5% aqueous potassium bicarbonate and water, then dried over anhydrous sodium sulfate and stripped of solvent under reduced pressure to afford, as an oil, 17α-methyl-2,3-seco-A-nor-5α-androstane-2,3,17β-triol 2,3-diacetate, characterized by the following structural formula

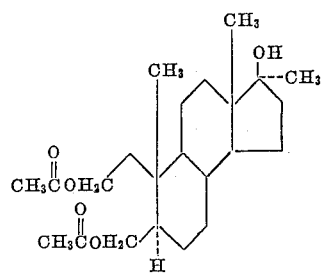

EXAMPLE 6

A mixture containing 1.25 parts of 17α-methyl-2,3-seco-A-nor-5α-androstane-2,3,17β-triol, 0.78 part of p-toluenesulfonyl chloride and 30 parts of pyridine is kept at room temperature for about 16 hours, then is diluted carefully with ice. The resulting mixture is stirred for approximately one hour, then is extracted several times with chloroform. The chloroform layers are combined and washed successively with hydrochloric acid and water, then dried over anhydrous sodium sulfate and stripped of solvent under reduced pressure. The resulting residue is purified by recrystallization from hexane to afford pure 17α-methyl-3-oxa-5α-androstan-17β-ol, melting at about 180–183°. This compound is represented by the following structural formula

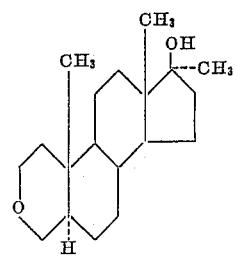

EXAMPLE 7

To a solution of 4.28 parts of 17β-acetoxy-3-oxa-5α-androstan-2-one in 900 parts of tetrahydrofuran is added 6.42 parts of lithium aluminum hydride, and the resulting mixture is stirred, under nitrogen, at room temperature for about 21 hours. To that mixture is then added successively 10 parts of water, 6 parts by volume of 20% aqueous sodium hydroxide and 25 parts of water. The precipitated inorganic salts are removed by filtration and washed on the filter with tetrahydrofuran. Removal of the solvent by distillation under reduced pressure affords a crystalline residue consisting of 2,3-seco-A-nor-5α-androstane-2,3,17β-triol.

The latter crystalline material is dissolved in 130 parts of toluene, and 0.04 part of p-toluenesulfonic acid monohydrate is added. The resulting reaction mixture is stirred at the reflux temperature for about 3 hours, then is distilled to a small volume under reduced pressure. Washing of the organic solution successively with dilute aqueous sodium hydroxide and water followed by drying over anhydrous sodium sulfate and removal of the solvent by distillation under reduced pressure affords a solid residue which is dissolved in benzene. The benzene solution is clarified by stirring with alumina, and the solvent is removed by distillation under reduced pressure. The resulting residue is recrystallized from hexane to afford 3-oxa-5α-androstan-17β-ol, melting at about 125–127° and characterized by the following structural formula

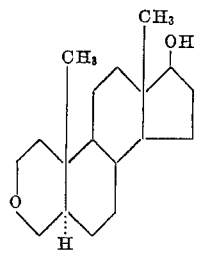

EXAMPLE 8

A mixture containing one part of 3-oxa-5α-androstan-17β-ol, 150 parts of pyridine and 50 parts of acetic anhydride is kept at room temperature for about 22 hours, then is diluted carefully with ice. The resulting mixture is stirred for about 3 minutes, following which time the crystalline product is separated by filtration. That material is purified by recrystallization from pentane to afford pure 3-oxa-5α-androstan-17β-ol 17-acetate, melting at about 115–116.5°. This compound can be represented by the following structural formula

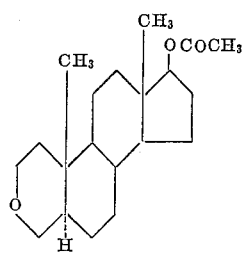

EXAMPLE 9

When an equivalent quantity of 17α-ethyl-17β-hydroxy-3-oxa-5α-androstan-2-one is substituted in the procedure of Example 4, there is obtained 17α-ethyl-2,3-seco-A-nor-5α-androstane-2,3,17β-triol.

EXAMPLE 10

The reaction of equivalent quantities of 17α-ethyl-2,3-seco-A-nor-5α-androstane-2,3,17β-triol and propionic anhydride according to the procedure described in Example 5 results in 17α-ethyl-2,3-seco-A-nor-5α-androstane-2,3,17β-triol 2,3-dipropionate.

EXAMPLE 11

By substituting an equivalent quantity of 17α-ethyl-2,3-seco-A-nor-5α-androstane-2,3,17β-triol and otherwise proceeding according to the processes described in Example 6, there is obtained 17α-ethyl-3-oxa-5α-androstan-17β-ol.

EXAMPLE 12

When an equivalent quantity of propionic anhydride is substituted in the procedure of Example 8, there is obtained 3-oxa-5α-androstan-17β-ol 17-propionate.

EXAMPLE 13

By substituting an equivalent quantity of 2,3-seco-A-nor-5α-androstane-2,3,17β-triol and otherwise proceeding according to the processes described in Example 5, there is obtained 2,3-seco-A-nor-5α-androstane-2,3,17β-triol 2,3,17-triacetate, characterized by the following structural formula

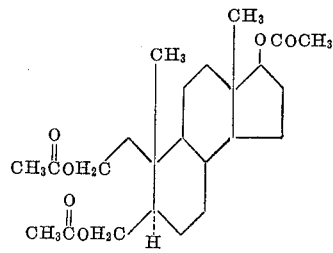

What is claimed is:
1. A compound of the formula

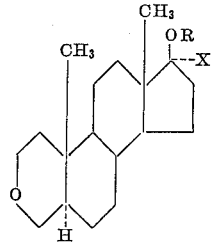

wherein R is a member of the class consisting of hydrogen and a lower alkanoyl radical and X is selected from the group consisting of hydrogen and a lower alkyl radical.
2. A compound of the formula

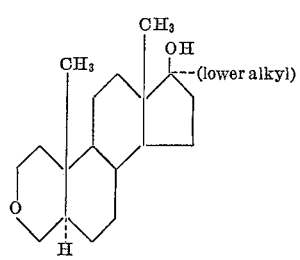

3. A compound of the formula

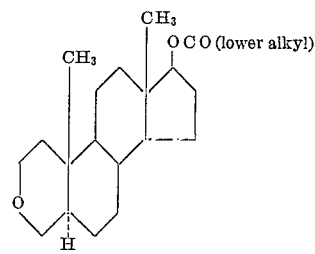

4. 3-oxa-5α-androstan-17β-ol.
5. 3-oxa-5α-androstan-17β-ol 17-acetate.
6. 17α-methyl-3-oxa-5α-androstan-17β-ol.
7. A compound of the formula

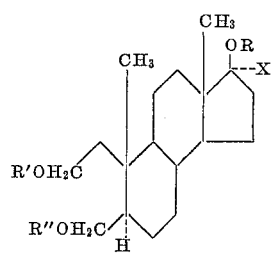

wherein R, R' and R" are selected from the group consisting of hydrogen and a lower alkanoyl radical and X is a member of the class consisting of hydrogen and a lower alkyl radical.

8. 17α - methyl - 2,3 - seco - A - nor - 5α - androstane-2,3,17β-triol.

9. 17α - methyl - 2,3 - seco - A - nor - 5α - androstane-2,3,17β-triol 2,3-diacetate.

10. 2,3-seco-A-nor-5α-androstane-2,3,17β-triol.

11. 2,3 - seco - A - nor - 5α - androstane - 2,3,17β - triol 2,3,17-triacetate.

References Cited

UNITED STATES PATENTS

| | | | |
|---|---|---|---|
| 2,883,424 | 4/1959 | Wildi | 260—488 |
| 3,019,252 | 1/1962 | Nomine et al. | 260—488 |
| 3,101,349 | 8/1963 | Pappo et al. | 260—617 |
| 3,128,285 | 4/1964 | Atwater | 260—345.2 |
| 3,293,284 | 12/1966 | Pappo et al. | 260—488 |

WALTER A. MODANCE, *Primary Examiner.*

JOHN M. FORD, *Assistant Examiner.*